J. G. VINCENT.
MOTOR VEHICLE.
APPLICATION FILED AUG. 30, 1916.
1,384,283.
Patented July 12, 1921.
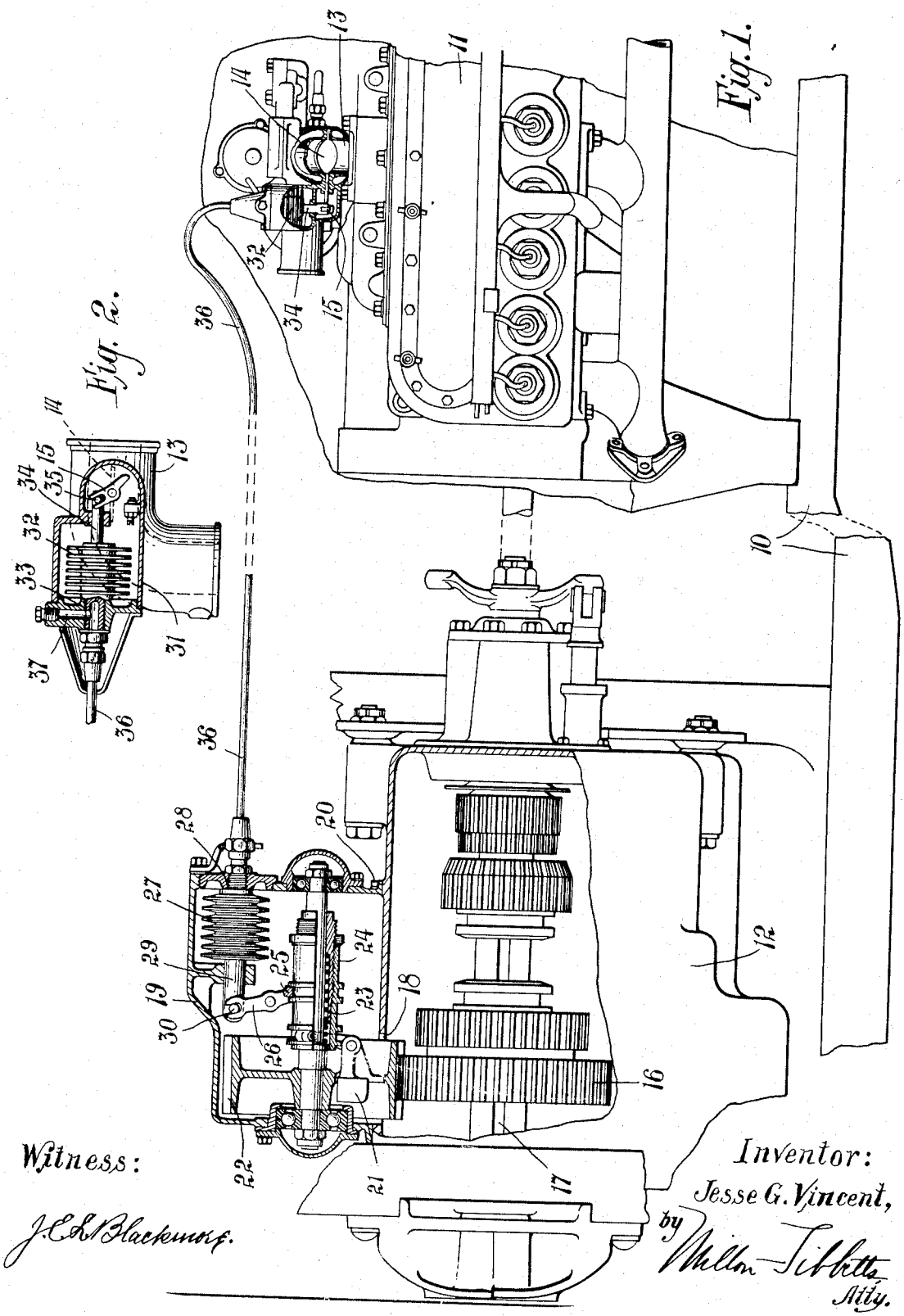
Witness:
J.C.L. Blackmore.
Inventor:
Jesse G. Vincent,
by Milton Tibbetts
Atty.

# UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,384,283.    Specification of Letters Patent.    Patented July 12, 1921.

Application filed August 30, 1916. Serial No. 117,772.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles and particularly to the motor control mechanism thereof.

Motor vehicles of the commercial type are usually provided with some sort of governor mechanism whereby the speed of the vehicle may be controlled to some extent. In such vehicles also it is customary to arrange a change speed mechanism between the motor and the driving wheels, and when the governor is driven by the motor to control the motor speed and thereby to control the vehicle speed, the lower gears of the change speed gearing are not as useful as they would be if the governor were operated by a moving part of the vehicle so that its action depended upon the speed of the vehicle rather than upon the speed of the motor. In some cases the governors have been connected so that their action depends upon the speed of the vehicle, but as this requires that the governor shall be mounted rearwardly of the driving shaft of the gear mechanism some difficulty has heretofore been experienced in providing suitable connections from the governor to the motor throttle.

One of the objects of the present invention is to provide a simple and efficient connection between a governor and a motor throttle.

Another object of the invention is to provide a non-circulating fluid connection between a governor and a motor throttle.

Another object of the invention is to provide a governor connection to one of the sliding gears of a change speed mechanism of a motor vehicle.

Other objects of the invention will appear from the following description taken in connection with the drawings which form a part of this specification, and in which:

Figure 1 is a plan view of part of a motor vehicle showing particularly parts of the motor and change speed gear mechanism and the connections between the governor and the motor throttle; and Fig. 2 is an enlarged detail sectional view of the control connection to the motor throttle.

Referring to the drawings, 10 represents a motor vehicle frame upon which is mounted a motor 11, preferably of the hydrocarbon type, and a change speed gear box 12. It will be understood that there is a suitable driving connection between the motor 11 and the gearing 12, usually in the form of a friction clutch which is not shown in the drawings.

The motor 11 is provided with a suitable intake pipe 13 in which there is a throttle valve 14, shown as in the form of a butterfly valve. This valve may be operated by an arm 15 shown both in Figs. 1 and 2. It will be understood that this throttle valve controls the supply of combustible mixture passing to the motor and thereby controls the speed of the motor.

The change speed gearing 12 may be of any desired form, and as shown one of the gears 16 is adapted to slide on the shaft 17 which is one of the driven shafts of the gearing. It will be understood that said shaft 17 is constantly connected through suitable shafts and gearing with one of the vehicle driving axles, so that whenever the vehicle is moving the shaft 17 and consequently the gear 16 are in operation, the speed of said shaft 17 and gear 16 depending entirely upon the speed of the vehicle.

In one side of the change speed gear casing is an opening 18, and an auxiliary casing 19 is fitted over the opening and secured to the gear box 12 as by bolts 20. In this casing 19 is mounted a governor 21 of the fly ball type and a gear 22 having a face considerably wider than the gear 16 is in constant mesh with the latter said gear so that the governor 21 which is mounted within said gear 22 is always operated at the speed of the vehicle. A spring 23 yieldingly holds the governor in inoperative position and a sleeve 24 surrounding the spring is moved by the governor to the left in Fig. 1 as the governor balls fly outwardly by centrifugal force. A yoke 25 on an arm 26 follows the action of the sleeve 24 as shown particularly in Fig. 1.

It will be understood that the movements of the arm 26 which is controlled by the governor must be imparted to the arm 15 of the throttle valve 14 in order to have the governor control the speed of the motor. In the present invention this is accomplished by means of a non-circulating fluid connection which is positive and quick in its action and yet admits of ready application to a vehicle in which the governor and throttle may be mounted at widely separated points.

In the form shown, there is an expansible and contractible casing 27 which is preferably made of spun metal in the fluted form shown in Fig. 1, which casing is secured at one end to the casing 19 as shown at 28. The opposite end of the casing 27 is free to move as the casing expands or contracts, and a rod 29 at said free end is connected as by a pin and slot connection 30 to the arm 26 above described. Thus it will be seen that any movement of the arm 26 will be communicated to the casing 27 through the rod 29, and the casing will therefore be compressed as the governor balls fly outwardly and it will be expanded again as the spring 23 causes the governor to assume its inoperative position. In Fig. 1 the governor is shown in inoperative position and the casing 27 is therefore expanded.

Formed as an integral part of or secured to the intake pipe 13 is a housing 31 in which the arm 15 is arranged and in which also there is an expansible and contractible casing 32 similar to the casing 27 hereinabove described. This casing 32 is also held firmly at one end as at 33 and its free or movable end is connected by a rod 34 through a pin and slot connection 35 with the arm 15 of the throttle valve 14. Thus the expansion and contraction of the casing 32 operates to close or open the throttle valve 14 as will clearly be seen in Fig. 2. The casing 32 is shown in fully compressed position in which the throttle valve 14 is wide open.

Connecting the casings 27 and 32 is a metal or other non-contractible and non-expansible pipe 36. This pipe may be more or less flexible and if necessary formed with several loops to give it greater flexibility, so that slight relative movement between the motor and the gear box would in no way affect the connection.

It will be understood that the piping 36 forms a continuous passage between the interior of the casing 27 and the interior of the casing 32, so that when the casings and piping are filled with a suitable fluid, such as oil, as by the filling opening 37 shown in Fig. 2, the contraction or squeezing together of the casing 27 will cause a flow of the fluid through the pipe 36 to the casing 32 and the latter will be expanded, in direct proportion as the casing 27 is compressed. Likewise if the casing 27 is returned to its expanded condition the liquid in the pipe 36 will return, and in turn contract the casing 32. In this manner the movements of the arm 26 of the governor are directly transmitted to the arm 15 of the throttle valve 14, and there is practically no chance for any wear to take place in the connections to vary the action of the governor on the throttle. Likewise, because of the sluggish action of the fluid and because of the difference in cross sectional area between the casings 27 and 32 and pipe 36 this connection between the governor and throttle valve acts as a dash pot to steady the action of the governor and its effect on the motor.

But one form of the invention is shown, but it will be understood that other forms and changes and alterations may be made within the scope of the claims without departing from the invention.

Having thus described my invention, what I claim and desire to secure by Letters Patent is:—

1. In a motor vehicle, in combination, a hydrocarbon motor having a throttle valve, a gear box having a sliding gear therein, a gear having a relatively long face in constant mesh with said sliding gear, a governor operated by said long faced gear, and connections from said governor to the throttle valve.

2. In a motor vehicle, in combination, a hydrocarbon motor having a throttle valve, a gear box having a sliding gear therein, a gear having a relatively long face in constant mesh with said sliding gear, a governor operated by said long faced gear, and hydraulic connections from said governor to the throttle valve.

3. In a motor vehicle, in combination, a hydrocarbon motor, having a throttle valve, a gear box having a sliding gear therein, a gear having a relatively long face in constant mesh with said sliding gear, a governor operated by said long faced gear, and non-circulating fluid connections from said governor to the throttle valve.

4. In a motor vehicle, a hydrocarbon motor having an intake manifold, a throttle valve pivoted therein, a housing secured to said manifold, a lever mounted on the throttle valve pivot, a gear box having gears therein, a governor mounted thereon and operatively connected to the gears in said box, a lever movable by said governor and a non-circulating fluid connection between said levers.

5. In a motor vehicle, a hydrocarbon motor having an intake manifold, a throttle valve therein, a housing secured to said motor and having disposed therein a lever for moving said valve, an expansible casing in said housing, a gear box having gears therein, a governor carried thereby and operatively connected to said gears, a lever movable by said governor, an expansible casing movable by said lever, and a fluid connection between said casings for transmitting motion from the governor to the throttle valve.

6. In a motor vehicle, a hydrocarbon motor having an intake manifold, a throttle valve pivoted therein, a housing secured to the manifold and receiving one end of the pivot pin of said valve, a lever mounted on said pin and disposed in said housing, an expansible and contractible casing in said housing and connected to said lever, a gear box having gears therein, a governor housing carried thereby, a governor mounted therein and operatively connected to the gears in said box, an expansible and contractible casing in said governor housing, a lever connection between the governor and said casing and a pipe connection between said casings.

In testimony whereof I affix my signature.
JESSE G. VINCENT.